(12) United States Patent
Alamri et al.

(10) Patent No.: US 11,584,108 B2
(45) Date of Patent: Feb. 21, 2023

(54) SUPERABSORBENT POLYMER CAPSULES AND BIO-MINERALIZATION PROCESS FOR THE MITIGATION OF CORROSION UNDER INSULATION AS SMART PACKAGING MATERIALS

(71) Applicant: Saudi Arabian Oil Company, Dhahran (SA)

(72) Inventors: Haleema Alamri, Thuwal (SA); Aziz Fihri, Paris (FR); Husnul Maab, Thuwal (SA); Ali Al Shehri, Thuwal (SA); Layla Alabdrabalnabi, Sayhat (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 466 days.

(21) Appl. No.: 16/555,745

(22) Filed: Aug. 29, 2019

(65) Prior Publication Data
US 2021/0060899 A1 Mar. 4, 2021

(51) Int. Cl.
| | | |
|---|---|---|
| *B32B 15/082* | (2006.01) | |
| *B32B 27/30* | (2006.01) | |
| *C08L 33/08* | (2006.01) | |
| *C08L 33/26* | (2006.01) | |
| *C08L 81/06* | (2006.01) | |

(52) U.S. Cl.
CPC ......... *B32B 15/082* (2013.01); *B32B 27/308* (2013.01); *C08L 33/08* (2013.01); *C08L 33/26* (2013.01); *C08L 81/06* (2013.01); *B32B 2307/726* (2013.01); *B32B 2419/00* (2013.01); *C08L 2203/18* (2013.01)

(58) Field of Classification Search
None
See application file for complete search history.

(56) References Cited

U.S. PATENT DOCUMENTS

| | | | | |
|---|---|---|---|---|
| 4,395,159 | A * | 7/1983 | Karuks | F16L 58/06 427/403 |
| 9,428,418 | B2 | 8/2016 | Dosier | |
| 2010/0086367 | A1 * | 4/2010 | Darson-Baulleur | C09K 17/00 435/253.6 |

(Continued)

FOREIGN PATENT DOCUMENTS

| | | | | |
|---|---|---|---|---|
| JP | 2002273805 A * | 9/2002 | | B29C 70/16 |
| KR | 101779935 B1 * | 9/2017 | | C04B 41/45 |
| WO | 2014131913 A1 | 9/2014 | | |

OTHER PUBLICATIONS

Achal—biogenic treatment concrete cracks—Constr.Build.Mat.—2013 (Year: 2013).*

(Continued)

*Primary Examiner* — John Vincent Lawler
(74) *Attorney, Agent, or Firm* — Leason Ellis LLP (57) ABSTRACT

A composite insulating material is provided. In one or more configurations the composite insulating material includes one or more active or responsive elements that mitigate corrosion under insulation (CUI). In a further aspect of the present invention, one or more active components of a composite insulation material are provided that dynamically generate an insoluble barrier within an insulating material through a bio-mineralization process.

6 Claims, 8 Drawing Sheets

(56) References Cited

U.S. PATENT DOCUMENTS

2016/0009596 A1    1/2016   Soens et al.

OTHER PUBLICATIONS

Ersan—enhanced crack closure microbial mortar—Cem.Conc. Comp.—2016 (Year: 2016).*
Giriselvam—crack healing efficiency of SAP in concrete—ISR D1—IOP Conf.Mat.Sci.Eng.—2018 (Year: 2018).*
PubChem—Calcium carbonate—CaCO3—Feb. 4, 2022 (Year: 2022).*
MicrobeOnLine.com—Oxygen Requirements for Pathogenic Bacteria • Microbe Online—Feb. 4, 2022 (Year: 2022).*
Yoshizaki +Yasuda—JP 2002-273805 A—MT—fiber-reinforced corrosive resistant resin coating for steel pipes—2002 (Year: 2002).*
Yang—KR101779935 B1—MT—concrete protection w-bacteria+SAP—2017 (Year: 2017).*
Wang—silica gel or PU immobilized bacteria for healing concrete—Constr.Build.Mat.—2012 (Year: 2012).*
Soltmann—sol-gel ceramics immobilizing microorganisms—J.Sol-Gel Sci.Tech.—2008 (Year: 2008).*
Fiedler—fiber-reinforced biocers—living cells—Chem.Mater.—2004 (Year: 2004).*
Written Opinion of the International Preliminary in Corresponding PCT Application No. PCT/US2020/048115 dated Feb. 15, 2021. 6 pages.
Giriselvam, M. G., et al. "Enhancement of crack healing efficiency and performance of SAP in biocrete." InIOP Conference Series: Materials Science and Engineering. IOP Publishing, 2018.
Wang, J. Y., et al. "Application of hydrogel encapsulated carbonate precipitating bacteria for approaching a realistic self-healing in concrete." Construction and building materials 68 (2014): 110-119.
International Search Report and Written Opinion in Corresponding PCT Application PCT/US2020/048115 dated Dec. 4, 2020. 11 pages.
NACE SP0198-2010; Standard Practice; Control of Corrosion Under Thermal Insulation and Fireproofing Materials-A Systems Approach.
Fischer, Karl P., et al. "Performance history of thermal-sprayed aluminum coatings in offshore service." Materials performance 34.4 (1995): 27-35.
Takami, Hideto, et al. "Complete genome sequence of the alkaliphilic bacterium Bacillus halodurans and genomic sequence comparison with Bacillus subtilis." Nucleic acids research 28.21 (2000): 4317-4331.
Matar, Gerald, et al. "Temporal changes in extracellular polymeric substances on hydrophobic and hydrophilic membrane surfaces in a submerged membrane bioreactor." Water research 95 (2016): 27-38.
International Preliminary Report on Patentability in Corresponding PCT Application PCT/US2020/048115 dated Apr. 15, 2021. 11 pages.

* cited by examiner

SUPERABSORBENT POLYMER CAPSULES AND BIO-MINERALIZATION PROCESS FOR THE MITIGATION OF CORROSION UNDER INSULATION AS SMART PACKAGING MATERIALS

FIELD OF THE DISCLOSURE

The present disclosure is directed to packaging or insulation materials that are designed to reduce or eliminate corrosion under insulation.

BACKGROUND OF THE DISCLOSURE

Corrosion under insulation (CUI) is a type of corrosion that occurs due to moisture buildup on the external surface of insulated metal equipment/piping. If undetected, the results of CUI can lead to, for example, failure of pipes and attendant consequences, such as the shutdown of a process unit or an entire facility. The precursor of the corrosion is the accumulation of moisture and water patches underneath the insulating layers. The corrosion of steel or other materials under insulation initiates due to the presence of water, oxygen, and other corrodents. Once water and oxygen are present on a metal surface, corrosion takes place via metal dissolution (anodic reaction), which is balanced by the reduction of oxygen. The rate of CUI is determined by factors such as the availability of oxygen, contaminants in water, temperature, and heat transfer properties of the metal surface and wet/dry conditions of the surface.

The insulation type used can include, for example, fibrous material (e.g., glass/mineral wool) or cellular material (e.g., calcium silicate, poly urethane, or poly styrene). One insulation structure starts from the inner (pipe surface) and moves towards the periphery, such as coating the pipe with a compatible coating system, then insulation to insulate the pipe, and then a metal jacket cladding. The cladding acts as a protective barrier/weather shield. It helps prevent the insulation from getting exposed to rain and physical damages.

The main contribution of insulation to CUI is to provide an annular space for the retention or accumulation of water, with access to air (oxygen). Water may be introduced from external sources such as rainfall and wash downs, or from condensation. The chemistry and properties of the insulation also play a role in CUI. The insulation material may wick or absorb water, thus providing the required aqueous environment for electrochemical reactions to take place. Furthermore, the chemicals within the insulation, such as chlorides and sulfates, may leach into the electrolyte causing an acceleration in the corrosion.

SUMMARY OF THE DISCLOSURE

In one or more non-limiting aspects of the present disclosure, a composite insulating material is provided. In one or more configurations, the composite insulating material includes one or more active or responsive elements that mitigate corrosion under insulation (CUI). In a further implementation of the composite insulating material provided herein, one or more active components of a composite insulation material are provided in order to dynamically generate an insoluble water barrier through a bio-mineralization process.

In one or more particular implementations, a composite, anti-corrosion insulator material is provided. The composite anti-corrosion insulator material includes an outer cladding jacket, an anti-corrosion layer, and an insulating material layer. Here, the anti-corrosion layer includes a plurality of porous superabsorbent capsules or fibers embedded with dormant microorganism spores and a nutrient source. The dormant microorganisms are revivable upon contact with water. Though biomineralization processes, the revived microorganisms generate a calcium carbonate barrier that inhibits further water intrusion.

In yet a further implementation, a method for producing a composite insulating material is provided. The method includes providing dormant, calcium carbonate producing microorganisms and a nutrition source to a porous superabsorbent polymer. The method also includes securing the superabsorbent polymer in a hosting matrix and forming a composite insulating material by combining an external cladding, the hosting matrix and a general insulating material.

BRIEF DESCRIPTION OF THE DRAWINGS

The present disclosure may be best understood by reference to the following drawings which are meant to be exemplary and not limiting, in which like references are intended to refer to like or corresponding parts and which.

DETAILED DESCRIPTION OF CERTAIN EMBODIMENTS ACCORDING TO THE DISCLOSURE

Recognizing the limitations of organic, polymer-based protective coatings, there exists a need to provide new packaging and/or insulating materials that can help prevent the penetration of water to the surface of an insulated material. To that end, what is needed in the art are alternative insulation materials that address the problem of CUI by providing reactive agents that remove moisture and generate protective moisture barriers in response to moisture infiltration.

By way of overview and introduction, the products and methods described herein are directed to a composite insulation material that includes anti-corrosion properties that inhibit or reduce the corrosion of the insulted material due to corrosion under insulation (CUI). For instance, the described composite insulation material includes active elements that respond to changes in the amount of water present in the insulation. When water infiltrates the composite insulation, active elements respond by generating at least a water insoluble or otherwise protective barrier that prevents or restricts further intrusion of water.

By way of non-limiting example, the composite insulation material described herein includes a plurality superabsorbent polymers that are coated or embedded with dormant microorganisms. Upon exposure to liquid water, these dormant microorganisms are revived. Through a process of biomineralization, the revived microorganisms generate a fluid impermeable barrier within a portion of the insulation material. Here, such the fluid impermeable barrier restricts or prevents the infiltration of water through the insulation material such that CUI is prevented restricted.

In one or more configurations, the microorganism embedded superabsorbent polymers can be added as a material layer that works in conjunction with common or commercially used insulation. In an alternative configuration, the microorganism embedded superabsorbent polymers described herein can be incorporated into insulation such that the microorganism embedded superabsorbent polymers are distributed within some or all of an insulating material.

Figure 1:
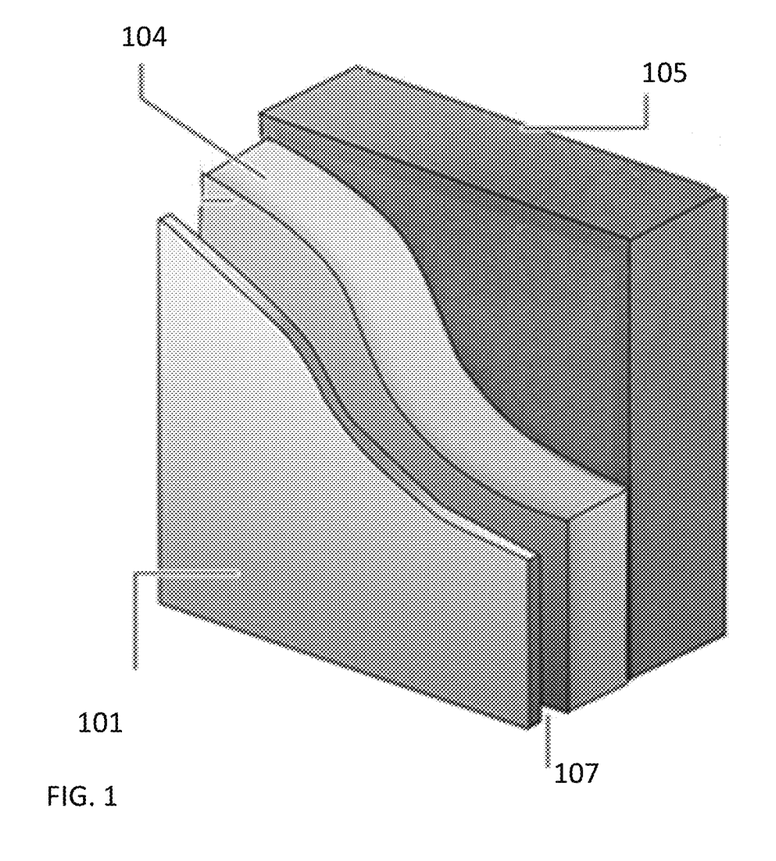
FIG. 1 illustrates a cross-section view of the composite insulation material without inclusion of anti-corrosion elements according to one or more embodiments of the present disclosure.

With particular reference to the drawings, in which like reference numerals refer to like elements, FIG. 1 illustrates a perspective cross-section of an insulated structure 105 and an insulation material provided therewith. Often materials, structures or components in need of insulation are encased in insulating material. For example, as shown in the perspective cross section of FIG. 1, the insulated structure 105 is encased or protected by bulk insulating material 104. In one or more implementations, the insulated structure 105 is a pipeline, conduit, vent, ductwork or similar structure. It will be appreciated by those possessing an ordinary level of skill in the requisite art that the insulated structure 105, can, in various alternative arrangements be any material where protection from exposure to direct environmental conditions (i.e. rain, washdowns, etc.) is desired.

With continued reference to FIG. 1, the bulk insulation material 104 abuts or encases the insulated structure 105. For instance, where the insulated structure 105 is a pipeline, the bulk insulation material 104 surrounds at least a portion of the total length of the insulated structure. The bulk insulation material 104 is, in turn, encased by a cladding material 101. In one arrangement the cladding material 101 is a metallic cladding jacket that prevents physical and environmental damage to the bulk insulating material 104. In alternative arrangements, the cladding material 101 is a synthetic, composite, or other material type suitable to protect the bulk insulating material 104. Typically, the cladding material 101 is not placed in direct contact with the general insulating material 104. Instead, an annular space 107 is provided between the cladding material 101 and the bulk insulating material 104. In typical insulation configurations, moisture infiltrates and collects within the annular space 107. From there, moisture penetrates the bulk insulating material 104 and corrodes the insulated structure 105.

In an alternative configuration not shown, the annular space 107 is provided between the insulated component 105 and the bulk insulator. In this configuration, the bulk insulating material 104 is in proximity to the cladding material 101 such that there is no annular space provided between the cladding jacket 101 and the bulk insulating material 104.

Figure 2:
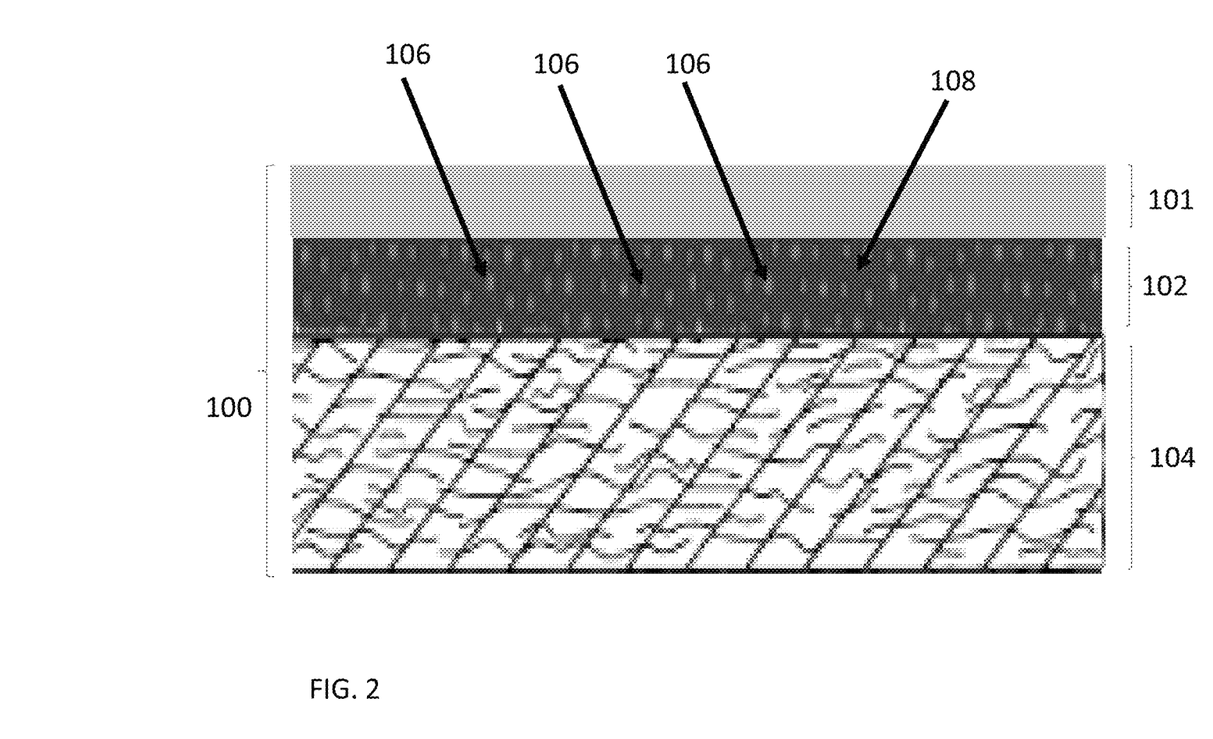
FIG. 2 illustrates a cross-section view of the composite insulation material with the inclusion of anti-corrosion elements according to one or more embodiments of the present disclosure.

Turning now to FIG. 2, the composite insulation material 100 is shown. Here, the composite insulation material 100 is configured such that an anti-corrosion material 102 is positioned within the annular space 107 between the bulk insulation and the cladding jacket 101. In an alternative configuration, however, the anti-corrosion material 102 is provided within an annular space between the insulated component 105 and the bulk insulator 104. In either configuration, the anti-corrosion material 102 is positioned and configured so as to reduce or eliminate the intrusion of liquid to the insulated component 105

In the non-limiting example provided in FIG. 2, the bulk insulation material 104 and the anti-corrosion material 102 together form a composite insulation material 100. In the depicted implementation, the composite insulation material 100 is made of one or more layers of anti-corrosion material 102 and one or more layers of bulk insulation 104. Here, such layers may be separately manufactured and combined at the time of installation. Alternatively, the bulk insulation material 104 and the anti-corrosion material 102 are joined, bonded, fused, or otherwise made into a single, multi-layer composite material.

In one or more further implementations, multiple layers of the anti-corrosion material 102 can used in connection with one or more layers of bulk insulating material 104. For instance, where a structure includes both an annular space between the bulk insulating material 104 and the insulated component 105, and an annular space between the bulk insulating material 104 and the cladding 101, the anti-corrosion material 102 can be placed in both annular spaces. In a further example, the composite insulating material 100 described can include alternating layers of material, such that layers of anti-corrosion material 102 are separated by layers of bulk insulating material 104. Such patterns of layers of material can be adapted or refined based on the particular need.

In one or more alternative implementations, the anti-corrosion material 102 is provided separately from the bulk insulation material 104. According to such an arrangement, the bulk insulating material and the anti-corrosion material 102 can be installed at different times. In this arrangement, while the two materials are placed in close proximity to one another, they are not a single integrated material.

Continuing with FIG. 2, the bulk insulation material 104 provided herein is formed of insulation materials commonly used in industrial applications. By way of non-limiting example, and with an understanding and appreciation that such materials may differ depending on the specific application and environment, the material used in the bulk insulation material 104 can be selected from one or more of fiberglass, PVC, steel wool, mineral or rock wool, aerogel, cellular glass, closed rubber cell, calcium silicate, polyurethane, polystyrene, or polyisocyanurate. For instance, and in no way limiting, the bulk insulation material 104 provided in FIG. 2 is formed of fiberglass.

With continued reference to FIG. 2, the anti-corrosion material 102 includes a plurality of polymers or other similar macromolecules. In one arrangement, the plurality of polymers is provided in a substrate or hosting matrix. For instance, where the polymers are configured as a bead or capsule 106, the polymers are supported by a substrate or hosting matrix 108 that suspends the particles so to provide a uniform distribution of polymers. In one implementations the supporting substrate or hosting matrix 108 is mineral wool insulation, glass wool, fiberglass, and polyurethane foam.

Depending on the nature of the polymer, the anti-corrosion material 102 can also include a formwork that includes one or more frames, forms, molds, and other apparatus or material which may be used to hold, secure or contain the polymers when used in accordance with the particular aspects of the disclosure described herein. In one or more implementations, the formwork is porous to permit the entrance of water into the formwork.

In one particular implementation, the polymers are configured to absorb moisture. For instance, the polymers included in the anti-corrosion material 102 are hydrophilic polymers. In a further implementation, the plurality of polymers included in the anti-corrosion insulation material are superabsorbent polymers (SAP). SAP are hydrogels capable of absorbing considerable amounts of water without dissolving.

Figure 3:
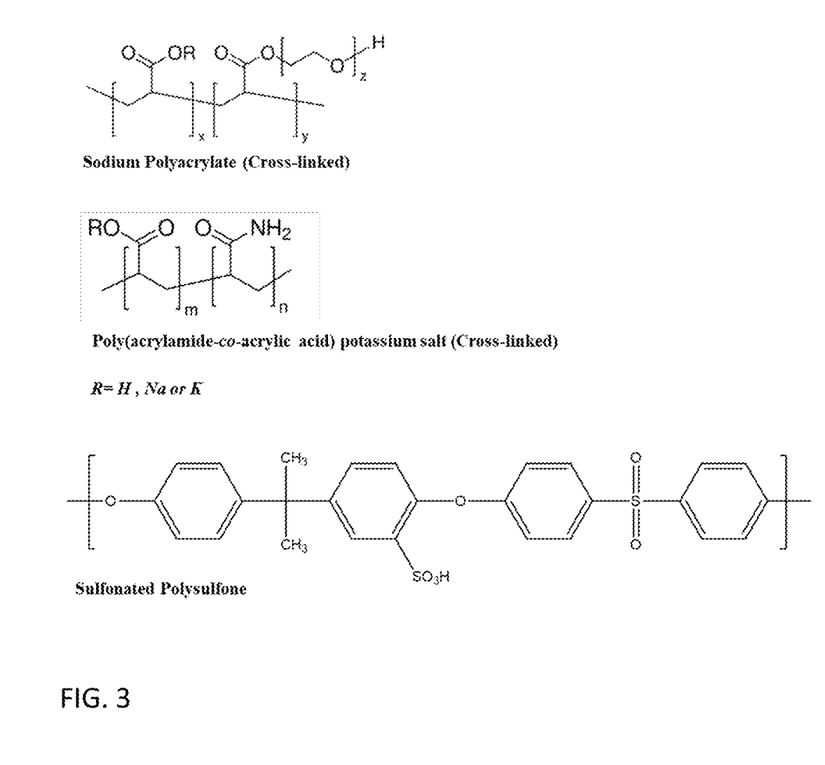
FIG. 3 provides skeletal formulae for the superabsorbent polymers according to one or more embodiments of the present disclosure.

In a particular configuration, as shown in the skeletal diagrams of FIG. 3, the SAPs used in the anti-corrosion material 102 are selected from one or more of sodium polyacrylate, poly(acrylamide-co-acrylic acid) potassium salt, or sulfonated polysulfone. Those possessing an ordinary level of skill in the requisite art will appreciate that other polymers that are able to absorb multiples of liquid relative to its mass are envisioned with respect to the foregoing.

Figure 4:
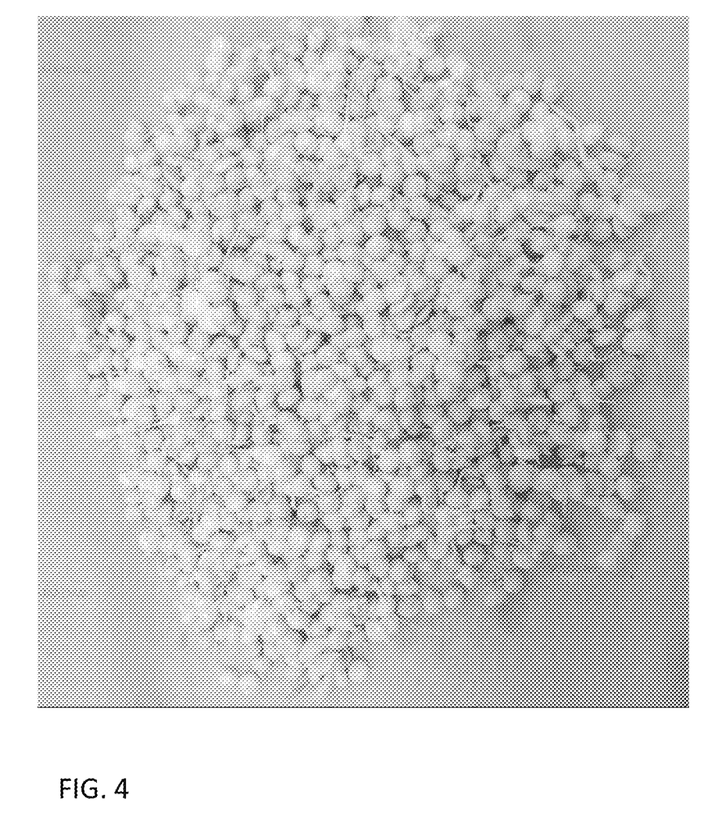
FIG. 4 depicts a capsule configuration of a polymer according to one or more embodiments of the present disclosure.

The polymers incorporated into the anti-corrosion material 102 are provided in a plurality of structural forms. As shown in FIG. 4, the polymers, such as one or more SAPs, are provided in the form of nodules, pellets or capsules. In a particular implementation the nodules, pellets or capsules have sizes ranging from of 1μ-to-1000 μm.

Figure 5:
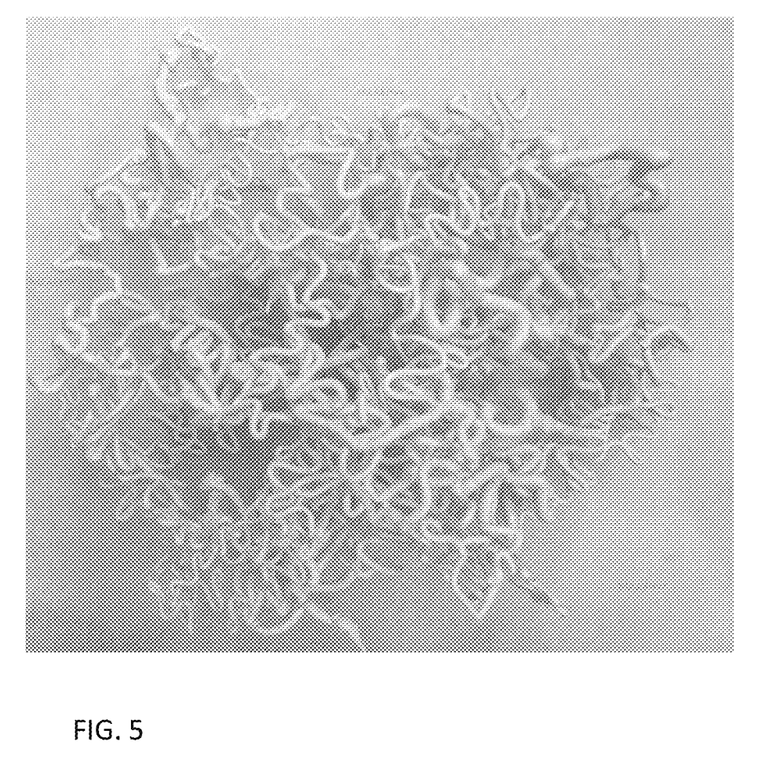
FIG. 5 depicts a fiber configuration of a polymer according to one or more embodiments of the present disclosure.

Alternatively, as shown in FIG. 5, the one or more polymers incorporated into the anti-corrosion material 102 are provided as synthesized fibers. Regardless of the configuration (capsules or fibers) the SAPs are synthesized such that either the capsules or the fibers have a porous microstructure.

Figure 6:
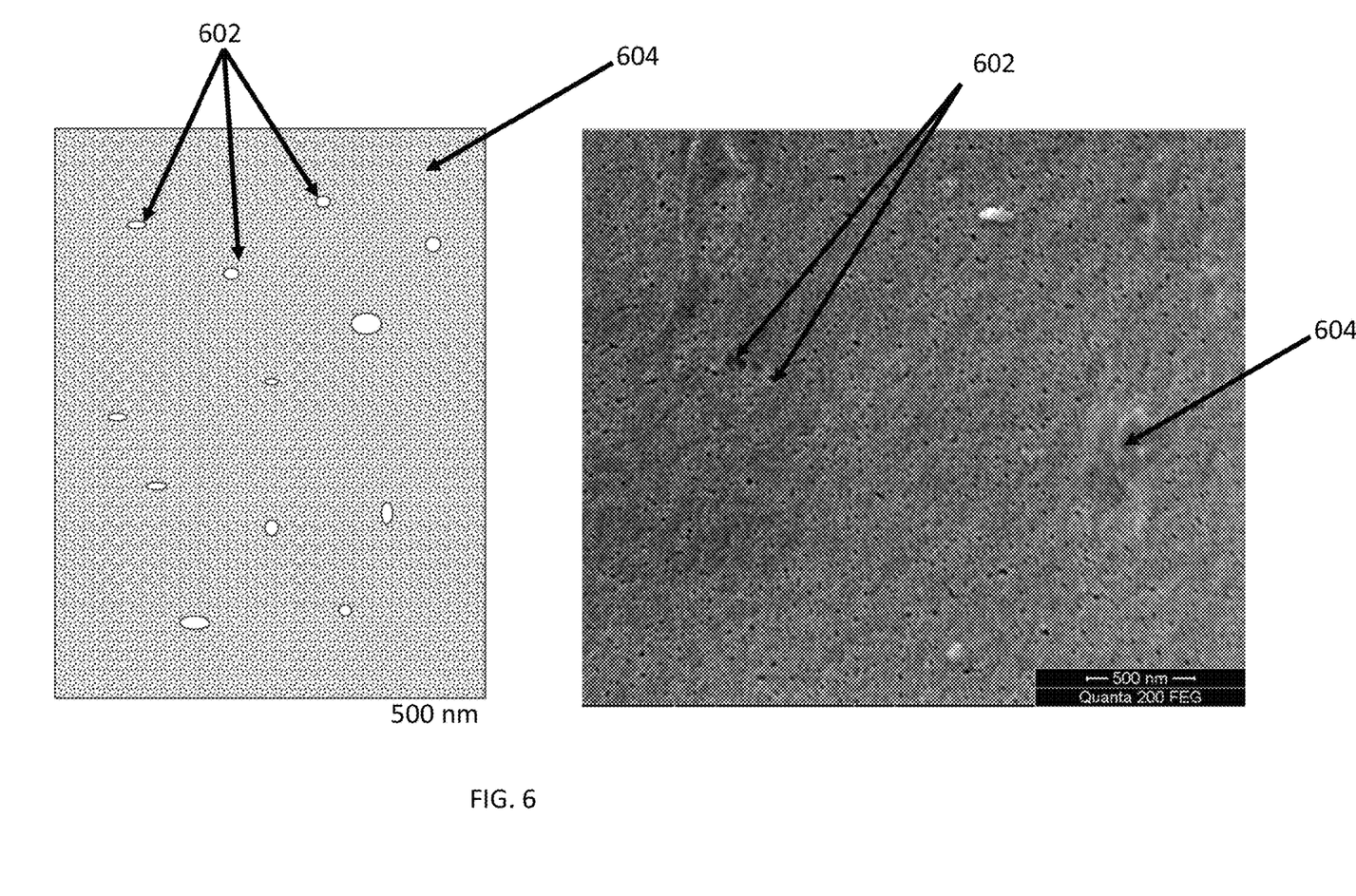
FIG. 6 depicts an electron scanning microscope image of the surface of a polymer according to one or more embodiments of the present disclosure.

Without being held to any particular theory, SAPs having a porous structure are able to absorb liquid (i.e. water) without swelling or otherwise significantly increasing is relative volume. As shown in FIG. 6 which shows an image taken of a sample synthesized PSf fiber using a scanning electron microscope and an illustrated representation thereof, the polymer has pores 602 on its surface 604 so as to prevent swelling of the SAP upon contact with water.

It will further be appreciated that the porous nature of the SAPs enhances it's microbial adhesion or hosting properties. For example, porous PSf fibers allow for improved bacterial adhesion to the surface of the polymers relative to non-porous polymers. As a result, such synthesized polymers require no further functionalization or treatment in order to be implemented as a host for microorganism such as bacterial spores.

Figure 7A:
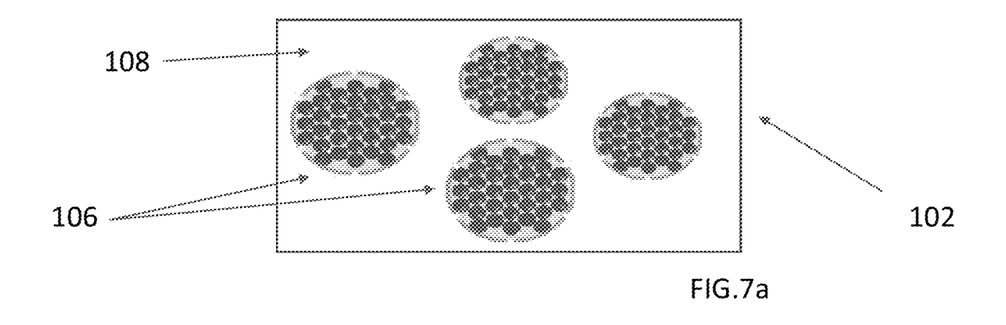
FIG. 7a illustrates an anti-corrosion element of the composite insulating material according to one or more embodiments of the present disclosure.

FIG. 7a depicts a cross-section of the anti-corrosion material 102. As shown, a plurality of polymer capsules 106 are distributed throughout a hosting matrix 108. The porous nature of the synthesized polymer capsules allows the encapsulation of microorganism or otherwise allows the capsules to be host to microorganisms. It will be appreciated that the microorganisms can be integrated into the capsules using one or more extrusion, spray drying, emulsification, and/or coacervation processors. By way of non-limiting example, the microorganisms and suitable nutrition source are mixed with polymeric aqueous solution then the resulting mixture will be immediately subjected to degassing using Freeze-drying technique to remove water to preserve the dormant state of the microorganism.

In one or more implementations, one or more strands, types, genius, species (modified or wild type) of microorganism is coated, applied or seeded onto the surface of the porous polymer fiber. In one or more implementations, microorganism are encapsulated in a polymer capsule. In one or more different configurations, the microorganism is selected for alkali-tolerant, heat, and contaminant tolerant characteristics.

In a further implementation, the microorganisms are selected based on the ability of the microorganism to generate insoluble materials. For example, the microorganisms encapsulated in the polymer capsules 106 include bacteria capable of producing insoluble material though the process of biomineralization. Microbially induced calcium carbonate precipitation, a form of biomineralization, is a natural phenomenon associated with a wide range of bacterial species. Here, microorganisms are able to precipitate, in response to a suitable nutrition source, calcium carbonate as a product or biproduct of its metabolism. In a particular configuration, the microorganisms selected for inclusion in the polymer capsules are selected from one or more different bacterial genus and species able to induce calcium carbonate precipitation. By way of non-limiting example, the polymer capsules 106 serve as host to bacteria such as *Bacillus* spp., *Spoloactobacilus* spp., *Clostridium* ssp. and *Desulfotomaculum* ssp. and *Sporosarcina* ssp. In a particular arrangement, the bacteria selected is an alkali-tolerant bacteria species, such as *Bacillus pseudofirmus*.

Figure 7B:
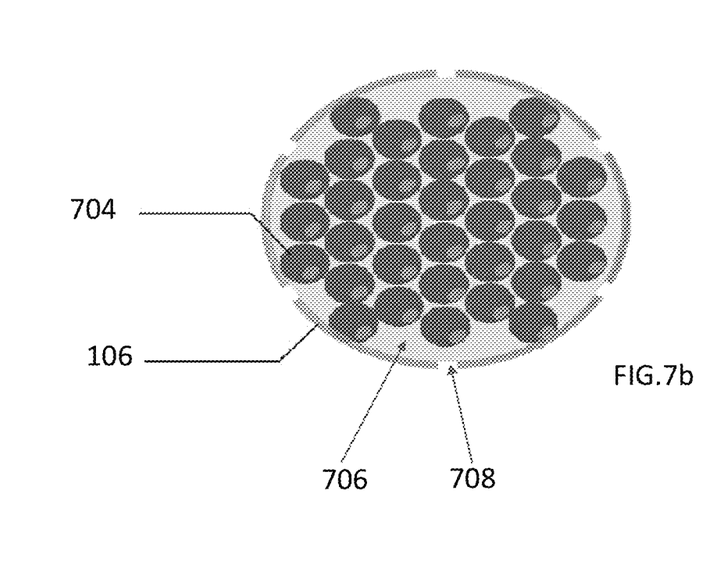
FIG. 7b illustrates a polymer capsule configuration incorporating microorganisms according to one or more embodiments of the present disclosure.

As shown in FIG. 7b, a plurality of microorganisms 704 are incorporated into the polymer capsules 106. Bacteria can often maintain periods of dormancy for many years, only to be revived in the presence of favorable environmental conditions. Dormant bacterial or bacterial spores can be activated though the presence of sufficient quantities of water and oxygen. In one arrangement, the microorganisms 704 are bacterial spores that can germinate under predetermined environmental conditions and once activated consume calcium to produce calcium carbonate through a bio-mineralization process.

Such dormant microorganisms can be revived after extended periods of little to no metabolic activity. In one particular arrangement, the microorganisms 704 are dormant bacterial spores or other dormant bacterial forms. In a further implementation, the dormant microorganisms 704 included in the polymer capsules 106 can be revived in the presence of liquid water, oxygen and nutrients.

In a further configuration, the polymer capsule 106 also includes one or more growing medium, feedstock or nutrient sources 706 for the microorganism 704. The term "growing medium, feedstock or nutrient source" used herein applies both the nutrients required for germination and/or growth of microorganisms 704, but also to one or more calcium sources used by the microorganism to provoke the formation of calcium-containing minerals. Such nutrient sources 706 include, but are not limited to, urea ($CO(NH_2)_2$), suitable carbon, calcium and nitrogen sources such as sugars, nutrient broth, yeast, yeast extract, organic oil, hydrated calcium nitrate ($Ca(NO3)_2*4H_2O$), calcium chloride, calcium acetate, calcium lactate and the like. In a particular implementation, the one or more nutrient sources 706 included within the polymer capsules 106 is calcium lactate or another calcium source that can be metabolized by the microorganisms 704.

As noted, the polymer capsules 106 have a porous surface. Such pores 708 allow for liquid to pass into the polymer capsule 106 and contact the microorganism 704. In one configuration, the porous structure of the polymer capsules permits the generated calcium carbonate precipitate on the internal surface of the capsules without damaging the overall structure of the polymer.

When water infiltrates the anti-corrosion material 102, the water penetrates the pores 708 of a polymer capsule 102 and comes into contact with the microorganism 704. In response, the microorganism 704 (i.e. bacteria) begins to germinate. Without being held to any particular theory, once the germinated microorganisms metabolize the nutrients provided as part of the nutrient source, the now active microorganism metabolize water, oxygen and the nutrition source and precipitate or otherwise generate insoluble calcium carbonate.

The introduction of both water and oxygen into anti-corrosion material 102 allows for the activation of the microorganism that are contained within polymer capsules 106 or coated on surfaces of the super absorbent polymers fibers (not shown). Once activated, though the process of bio-mineralization, limestone (i.e. calcium carbonate) or another insoluble precipitate is formed. As a result, the composite insulation material 100 develops into a corrosion protection layer by producing calcium carbonate which prevents further infiltration of water.

By way of particular example, an insoluble barrier can be formed in response to the presence of water in the insulation material. In one particular implementation, precipitation of calcium carbonate takes place according to the following formula:

$$Ca^{2+} + CO3^{2-} \rightarrow CaCO_3 \qquad \text{i.}$$

For example, when moisture infiltrates the anti-corrosion material 102 from the protective cladding 101, the water comes into contact with microorganisms 704. In one or more implementations where the microorganism 704 are bacterial spores, the presence of water and nutrients (706) causes the bacterial spores to germinate and begin metabolizing the nutrients 706. As a byproduct of metabolizing the nutrients 706, the germinated bacteria produce $CO3^{2-}$. A second biproduct of the bacteria metabolization of the nutrients produces $Ca^{2+}$ ions. When $CO3^{2-}$ ions meet with $Ca^{2+}$ ions (from the nutrient source), $CaCO_3$ (calcium carbonate) is formed.

Figure 8:
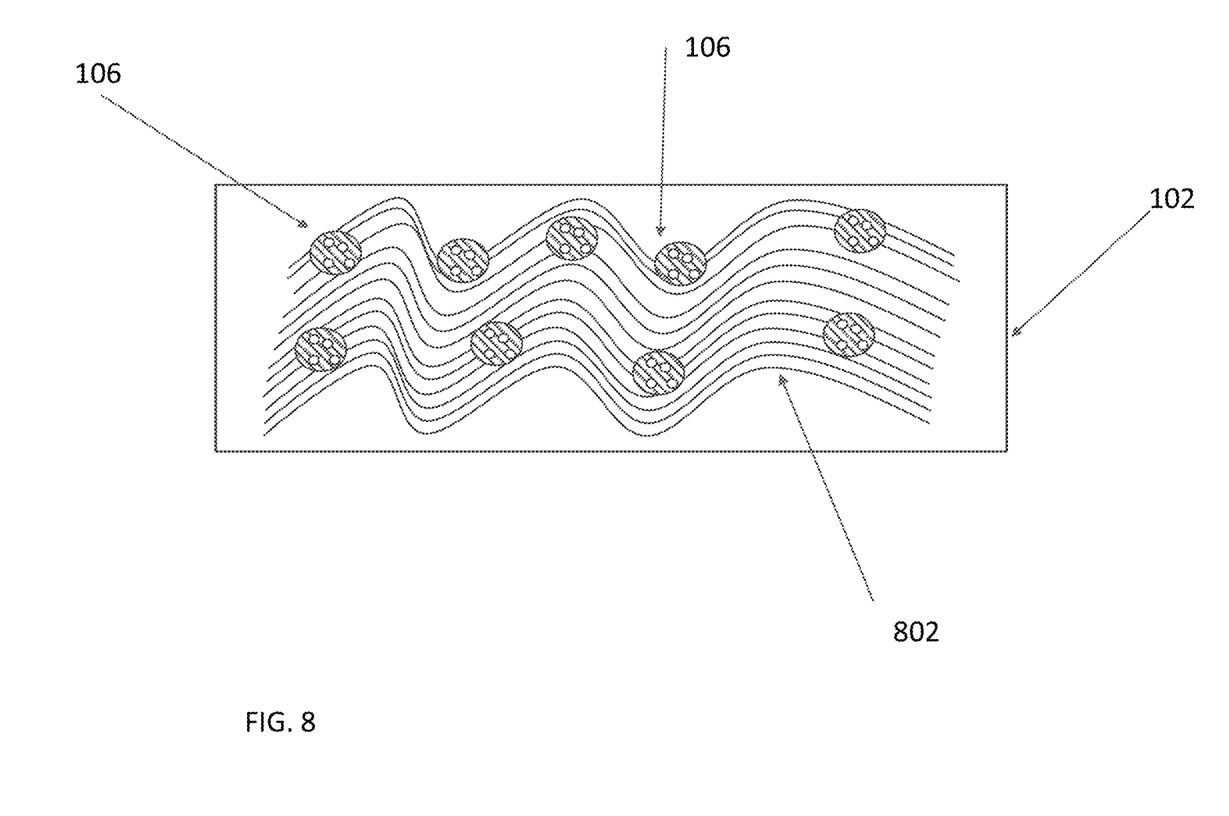
FIG. 8 illustrates a perspective view of the anti-corrosion element according to one or more embodiments of the present disclosure.

Turning now to FIG. 8, the polymer capsules 106 are embedded into a hosting matrix 802 to form the anti-corrosion material 102. In one arrangement, the hosting matrix 802 is formed of material having insulating properties. For instance, the hosting matrix 802 is formed of fiberglass or another insulating material. In an alternative configuration, the SAP fibers, (as shown in FIG. 5) can form the basis of a hosting matrix 802. In one particular configuration the hosting matrix 802 formed of SAP fibers is not coated or seeded with microorganism 704. Here, the SAP fibers provide liquid absorption properties as well as supporting an even distribution of the capsules 106. In an alternative arrangement, the SAP fibers are further seeded or coated with microorganisms and nutrient sources.

In a further arrangement, the hosting matrix 802 is a material that has that a strong affinity to water and is able to contain it. Regardless of the composition of the hosting matrix 802, the composite insulation material 102 is positioned so as to intercept and prevent further intrusion of liquid. In one arrangement, this can be accomplished as a single hosting matrix layer 802 that incorporates capsules 106. In alternative configurations, several layers of hosting matrices, each with different microorganism or nutrition sources, or both, are provided. For instance, the composite insulation material 102 can, in one implementation, include several layers of capsules 106, wherein each layer of capsule includes a different microorganism 704 that is tailored to a specific environmental condition or specific application. For instance, where the bulk insulation material 104 is expected to contain chlorides (as in asbestos), such chlorides might interfere with the metabolism of certain microorganisms. As such, in the layers that abut the bulk insulation material 104, the polymer capsules 106 contain microorganisms 704 that have a high tolerance for chloride containing solutions.

The temperature of the metal surface plays an important role with regard to CUI. In general, increasing the temperature increases the rate at which electrochemical reactions take place, thus increasing the corrosion rate. At some point, though, further increases in temperature reduce the corrosion rate due to the lack of a corrosive environment as water evaporates. However, as water evaporates, the concentration of corrosive species on the metal surface increases, which increases the corrosion rate. Furthermore, high temperatures reduce the service life of protective coatings and sealants, which also increases the corrosion rate. In an open system, the oxygen concentration in water decreases with increasing temperature, thus decreasing the corrosion rate. In contrast, the corrosion rate in a closed system increases with increasing temperature. Thus, in one or more implementations, the microorganisms 704 and superabsorbent polymers selected for inclusion in the materials described herein are selected based on a temperature range and type of insulation system envisioned. For example, where the system is closed, the microorganism and polymers selected are those having relatively high heat tolerances. Similarly, in open system, the microorganism selected are those having relatively high tolerance for low oxygen environments.

In another implementation of the approaches described herein, the microorganisms described are embedded in a plurality of polymer fibers. For example, the polymer fibers illustrated in FIG. 5 serve as a host to a plurality of microorganisms and nutrients. In a further implementation, the microorganism embedded polymers form the anti-corrosion material 102. Here, the use of the microorganism embedded fibers eliminates the need to provide a hosting matrix. However, such fibers can be encased in a formwork to provide structural stability when installing or manipulating the anti-corrosion material 102.

In an alternative implementation of the present disclosure, either the polymer capsules 106 or the microorganism embedded polymer fibers are incorporated into the bulk insulating material 104. In this configuration, there is no separate anti-corrosion material placed adjacent to the bulk insulating material 104. In this implementation, the bulk insulating material 104 incorporates the anti-corrosion properties such that upon exposure to water, a portion of the bulk insulating material 104 generates a insoluble material barrier.

In one or more further implementations, a multi-layer insulator is provided that includes an outer cladding jacket, an anti-corrosion layer and an inner insulating layer. Here, the anti-corrosion layer is formed of porous surface SAP capsules or fibers that have embedded dormant microorganism spores and a nutrient source. Such a multi-layer insulator is affixed to a component in need of insulation.

It will be appreciated that when the anti-corrosion layer is disposed between the cladding jacket 101 and the bulk insulation material 104, the use of such an insulation material permits the ready inspection of the anti-corrosion layer. For example, based on direct examination of the amount of calcium carbonate precipitated into the anti-corrosion layer, an inference can be made as to the amount of moisture encountered.

In yet a further implementation, a method for producing an insulating material is provided. Such a method includes providing dormant calcium carbonate producing microorganisms and a nutrition source to a porous superabsorbent polymer. In a further step, the method also includes securing the superabsorbent polymer in a hosting matrix and forming a composite insulating material by combining an external cladding, the hosting matrix and a general insulating material. Such a method can be carried out using either the polymer capsules or the polymer fibers as a source material for the anti-corrosion material.

In additional to the application of a multi-layer insulator to various pieces of infrastructure (e.g. pipes etc.) already installed, one or more configurations of the multi-layer insulator described can be used as smart packaging for equipment or hardware. For example, pipes and other hardware can be packaged in one or more configurations of the multi-layer insulator described herein. Such packaging can prohibit corrosion or moisture intrusion of such hardware when in transport or being stored. In another configuration, one or more configurations of the described multi-layer insulator can be applied to other objects or structures in need to anticorrosion protection. For example, one or more configurations of the multi-layer insulator described herein can be applied to any structure, object, or equipment that is susceptible to corrosion. By way of non-limiting example, one or more configurations of the multi-layer insulator can be used to provide smart packaging, encasement or encapsulation for an object in order to provide enhanced corrosion resistance when exposed to the elements and to mitigate the intrusion of moisture to from the external environment.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the disclosure has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A composite insulation material, comprising:
    an anti-corrosion layer comprising a hosting matrix formed of an insulating material comprising at least one of mineral wool insulation, glass wool, fiberglass, and polyurethane foam, wherein the hosting matrix includes a plurality of porous superabsorbent polymers distributed within the hosting matrix, wherein the porous superabsorbent polymers are host to a plurality of microorganisms, wherein the microorganisms are adapted to precipitate an insoluble material through a biomineralization process in the presence of at least liquid water, oxygen and a nutrition source; and
    an insulating layer.

2. The composite insulation material of claim 1, further comprising an outer cladding jacket having an exterior surface and an inner surface, wherein the outer cladding jacket is selected from one or more of aluminum, steel, or composite material.

3. The composite insulation material of claim 1, wherein the hosting matrix is fiberglass.

4. The composite insulation material of claim 2, wherein the anti-corrosion layer is disposed in proximity to the inner surface of the outer cladding jacket.

5. The composite insulation material of claim 1, wherein the insulating layer is disposed between the anti-corrosion layer and a metallic equipment article.

6. The composite insulation material of claim 1, wherein the insulating layer is selected from one or more of fiberglass, PVC, steel wool, mineral or rock wool, aerogel, cellular glass, closed rubber cell, calcium silicate, polyurethane, polystyrene, or polyisocyanurate.

* * * * *